(12) United States Patent
Gasparik

(10) Patent No.: US 6,871,249 B2
(45) Date of Patent: Mar. 22, 2005

(54) PCI-X 2.0 RECEIVER WITH INITIAL OFFSET FOR BIASED IDLE TRANSMISSION LINE

(75) Inventor: Frank Gasparik, Monument, CO (US)

(73) Assignee: LSI Logic Corporation, Milpitas, CA (US)

( * ) Notice: Subject to any disclaimer, the term of this patent is extended or adjusted under 35 U.S.C. 154(b) by 514 days.

(21) Appl. No.: 10/152,872

(22) Filed: May 21, 2002

(65) Prior Publication Data

US 2003/0229747 A1 Dec. 11, 2003

(51) Int. Cl.[7] .......................... G06F 13/42; H03K 17/16
(52) U.S. Cl. .................................... 710/106; 326/30
(58) Field of Search ................................ 710/305, 106; 326/30–33; 713/300, 313, 324, 340

(56) References Cited

U.S. PATENT DOCUMENTS

| | | | | |
|---|---|---|---|---|
| 5,430,396 A | * | 7/1995 | Morano | 326/90 |
| 5,585,741 A | * | 12/1996 | Jordan | 326/30 |
| 5,942,809 A | * | 8/1999 | Hashimoto | 307/43 |
| 6,084,424 A | * | 7/2000 | Gasparik | 326/30 |
| 6,243,817 B1 | * | 6/2001 | Melo et al. | 713/300 |
| 6,281,731 B1 | | 8/2001 | Fifield et al. | 327/205 |

* cited by examiner

Primary Examiner—Tim Vo
(74) Attorney, Agent, or Firm—Suiter West PC

(57) ABSTRACT

A receiver with initial offset for biased idle transmission line suitable for providing a programmable amount of initial offset. The receiver comprises a standard differential receiver and one or more initial offset modules. Each initial offset module includes a transistor and two or more switches, which control the amount of offset to the differential receiver. A first switch receives a digital signal, which programs the amount of offset and a complementary digital signal is sent to a second switch to control the addition of the selected initial offset module(s).

21 Claims, 2 Drawing Sheets

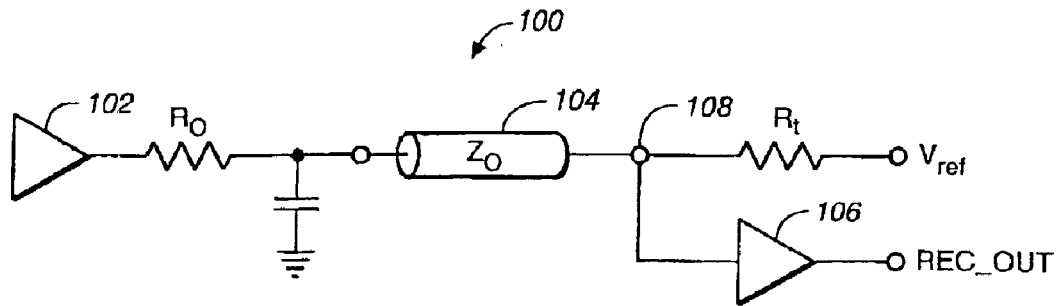
FIG._1
*(PRIOR ART)*
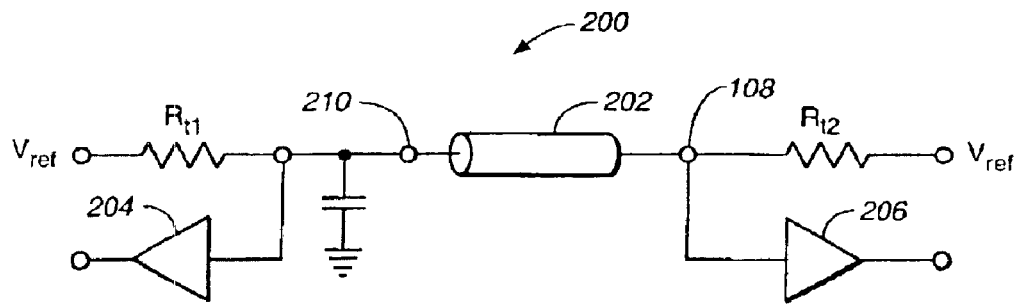
FIG._2
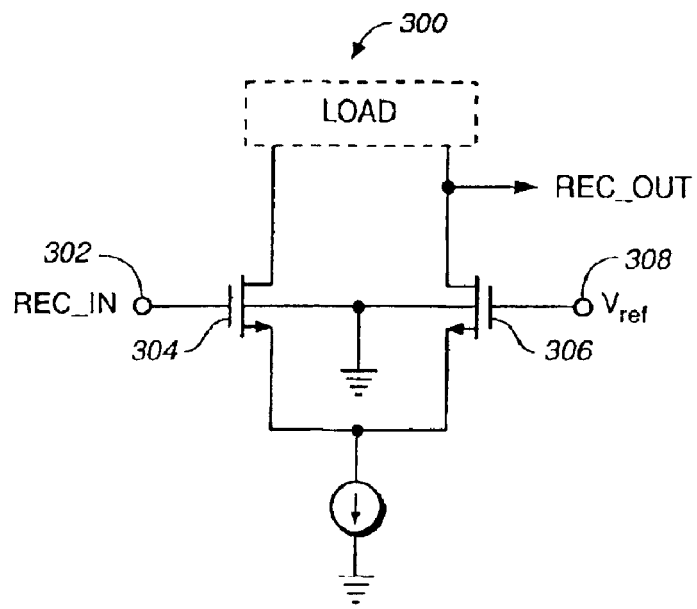
FIG._3

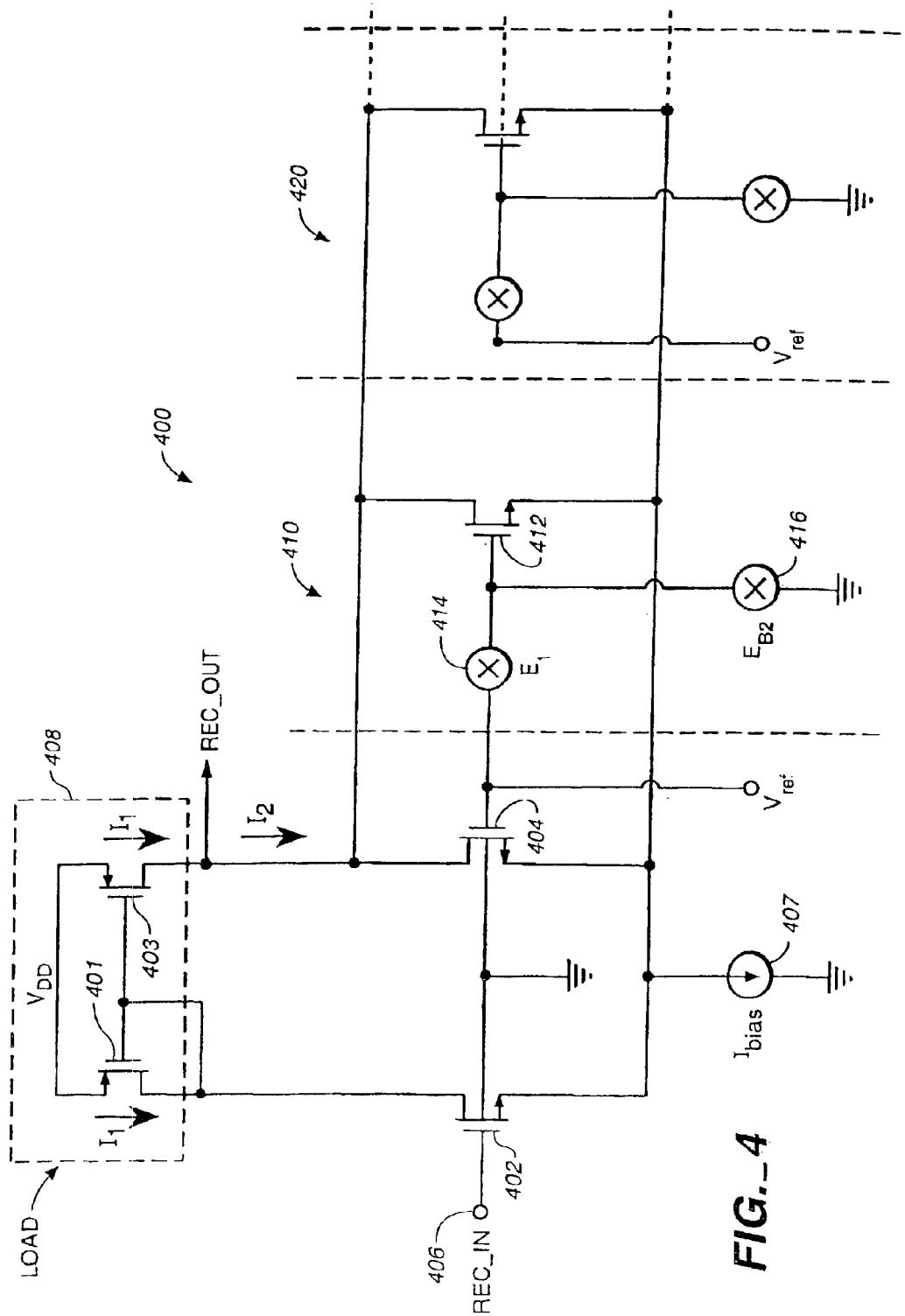
FIG._4

PCI-X 2.0 RECEIVER WITH INITIAL OFFSET FOR BIASED IDLE TRANSMISSION LINE

FIELD OF THE INVENTION

The present invention generally relates to the field of data transfer interfaces, and particularly to an interface receiver capable of providing a programmable initial offset for an idle transmission line.

BACKGROUND OF THE INVENTION

Data transfer interfaces provide an interface and a communication mechanism between a microprocessor and peripheral components. One type of a data transfer interface is Peripheral Component Interconnect (PCI) technology. Past generation of the PCI technology utilize un-terminated transmission media in point-to-point system configurations. Latest PCI technology, such as Peripheral Component Interface, Double Data Rate (PCI-X 2.0), include multi-point configurations which require terminated transmission media.

An example of a terminated and driven PCI-X 2.0 system 100 is shown in FIG. 1. The PCI-X 2.0 driver 102 has an output impedance Ro equal to characteristic impedance of the transmission line Zo from the PCI bus 104, i.e. Ro=Zo. At the far-end, the transmission line is terminated by a termination impedance Rt equal to Zo, i.e. Rt=Zo. The far end terminator is connected to a reference voltage Vref+. Node 108, at the far-end of the transmission line, connects a receiver 106 to the system. Receiver 106 has an output state identified by REC_OUT. This ideal, point-to-point, terminated transmission system 100 provides minimized signal reflections for optimum signal integrity.

A problem associated with the transceiver system configuration 100 as shown in FIG. 1 occurs during an idling or tri-stated PCI bus. While the PCI-X 2.0 drivers are tri-stated, the potential of all lines will settle at the reference voltage. In this case, the differential receiver has no differential input signal except for the noise presented on the bus. The output of the receiver is not defined and will depend upon a number of instantaneous noise factors. In such a tri-stated system, all drivers are disabled and the bus has no additional control signals available to control the receiver. Additionally, use of a traditional receiver with input hysteresis is prohibitive due to the lowering of the noise margin for the PCI-X 2.0 system. Consequently, it would be desirable to provide a receiver with an initial offset for a biased idle transmission line in order to maintain a determinate output state for the receiver.

SUMMARY OF THE INVENTION

Accordingly, the present invention is directed to a receiver with a programmable initial offset for a biased idle transmission line. In one embodiment, a receiver of the present invention may include an initial offset module. An initial offset module may include a transistor and two or more switches. The programmable receiver may be preferably configured to engage the initial offset until the first signal transition of a REC_IN input in order to maintain the sensitivity and low skew of the differential receiver. The initial offset may be enabled by use of a tri-state command for the driver portion. Initial offset may be provided in accordance with the present invention by redistributing current flow within the receiver of the present invention.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description serve to explain the principles of the invention.

BRIEF DESCRIPTION OF DRAWINGS

The numerous advantages of the present invention may be better understood by those skilled in the art by reference to the accompanying figures in which:

FIG. 1 is a block diagram of a terminated and driven PCI-X 2.0 system known to the art;

FIG. 2 is a block diagram of a terminated and idle data transfer system known to the art;

FIG. 3 is a circuit diagram illustrating a differential receiver in accordance with an exemplary embodiment of the present invention; and FIG. 4 is a circuit diagram of a receiver with initial offset for biased idle transmission line in accordance with an exemplary embodiment of the present invention.

DETAILED DESCRIPTION

Reference will now be made in detail to the presently preferred embodiments of the invention, examples of which are illustrated in the accompanying drawings.

Referring to FIG. 2, a typical data transfer system configuration 200 is shown. In one embodiment, data transfer system 200 may be a PCI-X 2.0 system. System 200 has a bus 202, a first receiver 204, a second receiver 206 and utilizes two terminated transmission lines Rt1 and Rt2. At the far-end, each transmission line is terminated by the terminator impedances Rt1 and Rt2, which are equal to the characteristic impedance of each transmission line. Each far-end terminator is connected to a reference voltage Vref, consequently, Node 208 and Node 210 have a potential approximately equal to Vref during an idle state.

Referring now to FIG. 3, a circuit diagram illustrating a differential receiver 300 in accordance with an exemplary embodiment of the present invention is shown. A differential receiver 300 is customarily implemented as the receivers in the data transfer system of FIG. 2. One side of the differential receiver is connected to the reference voltage Vref at node 308. The second input of the differential receiver is connected to the far or near-end of a transmission line from a bus at node 302, monitoring the potential of the line. The differential receiver includes a pair of N-channel transistors, 304 and 306, biased by a constant current source 310. Load 312 is a current mirror load circuit as described in FIG. 4. As long as the transmission line is driven, the receiver has an input signal, REC_IN, with a potential that swings lower or higher than Vref, depending upon the driven signal polarity. Consequently, the output state, at REC_OUT, of the differential receiver is deterministic and stable.

As shown, when the voltage at node 302 is approximately equal to Vref, both inputs of the differential receiver 300 are approximately equal to Vref When both inputs 302, 308 of the differential receiver are tied together, the receiver output is in an indeterminate state due to its reliance on instantaneous noise values present on the bus, voltage reference, and initial offset along with parametric differences of transistors 304, 306. For example, the noise from the PCI-X 2.0 idle bus on node 302 (Vnbus), the noise of the reference voltage Vref (vnref) and the parametric differences of transistors 304 (MN1) and 306 (Mn2) (intrinsic input offset voltage Vioff), will cause variation in instantaneous differential input signal of the receiver, Vin=V(REC_IN)−Vref. Unless the input differential voltage is maintained larger than the noise signals and the input offset, i.e., |Vin|>|Vnbus+Vnref+Vioff|, the differential receiver will be in an indeterminate state.

FIG. 4 illustrates an embodiment of a receiver 400 with initial offset for a biased idle transmission line in accordance with the present invention. Receiver 400 includes a differential pair of equally sized N-channel transistors 402 and 404, biased by a constant current source 407 (Ibias) and a customary circuitry identified as Load 408. One of the receiver inputs is connected to a reference voltage source Vref and the second input, at node 406, REC_IN is connected to a bus.

Load 408 may include a voltage supply VDD and transistors 401, 403. In one embodiment of the invention, transistors 401, 403 may be p-channel MOS transistors. In order to maintain a defined output state at REC_OUT the currents I1 and I2 must not be equal to one another. Load 408 is a current mirror load circuit where transistors 401 and 403 are of identical size. Diode-connected transistor 401 has the drain tied to its gate. Drain current I1 of transistor 402 flows through the transistor 401 and is mirrored by the transistor 403 again as I1.

For identically sized devices 402 and 404, a non-zero differential input Vdiff=Vrec_in−Vref makes one of the I1 or I2 currents larger. Drain current I2 of transistor 404 is summed at the node REC_OUT with the current I1. Resulting output will be either high or low, thus, maintaining a deterministic output state.

A deterministic output state for the zero differential input (as it is in the case of idle transmission line) may be achieved when one of the devices in the differential pair 402 or 404 is made effectively larger. In such a fashion, the larger device may conduct more current. Transistor 404 may be made effectively larger by connecting transistor 412 in parallel. The current I2 may be larger than current I1, consequently, the REC_OUT state may be low and deterministic upon an idling transmission line.

Initially, one or more modules may be enabled. In exemplary embodiments Module "A" 410 is enabled. Parallel to transistor 404 is connected transistor 412 via switch 414. The switch 416 is open and Module "B" 420 is disconnected. Transistor 412 with switches 414 and 416 comprise Module A 410. In other embodiments, similar groups of two switches and one transistor, such as those shown in Module B 420, may be connected in parallel with Module A 410. The number of modules can be chosen in a way to achieve a desired programmable input offset, thus providing an adjustable offset.

Complementary digital signals E1 and EB1 turn switch 414 "on" and switch 416 "off". The size of transistor 412 may be a fraction of the size of transistor 404. The parallel connection of 404 and 412 induces an offset to the differential receiver. This results in a larger amount of current flowing through these two transistors 404 and 412 than through the transistor 402 if both inputs of the differential amplifier are tied together to the Vref. Consequently, the receiver output, REC_OUT, may be in a defined state even if no differential input signal is applied, as is the case of an idle bus.

For example, Module 1, is programmed by digital signal E1 which allows an amount of current to be redistributed based on the needs determined by the algorithm. Complementary digital signal EB1 controls the addition of Module A 410 to the differential receiver. In other embodiments, the amount of offset may be programmed by digital signals E1, E2, . . . En and their complementary digital signals EB1, EB2, . . . Ebn, which are controlling the addition of selected Module A, Module B, . . . Module N. The controller may maintain a register, which enables it to engage and disengage the appropriate number of modules, at the appropriate time, in order to maintain the desired defined output state.

The amount of offset (Voff) applied may be determined by the application of an algorithm. As mentioned before, the use of a differential receiver with hysteresis is prohibitive due to lowering the noise margin of the PCI-X 2.0 system and other factors such as receiver output signal skew. By utilizing the switchable transistor 412 to induce an input offset voltage to the receiver when the input REC_IN is tied to the Vref the parallel combination of transistors 404 and 412 will conduct greater current than transistor 402 and the output REC_OUT will be in a deterministic state. The desired mount of input offset voltage (Vos) may be calculated by using the following equation:

$$Vos = \Delta Vt + [½ * (Vgs - Vt)][(-\Delta R1/R1) - \Delta(W/L)/(W/L)]$$

Where
$\Delta Vt$=Difference in threshold voltage Vt1−Vt2 of transistors 402 and 404
Vgs=Gate to source voltage of transistors 402 or 404
$\Delta R1$=difference in load impedances R11−R12
R1=Load impedance
$\Delta(W/L)$=width to length ratio of transistor 412
For the case when Vt1=Vt2, R11=R12 and (W/L) 420=(W/L) 404, the amount of desired offset is proportional to the last term in the equation, i.e.

$$Vos = [½ * (Vgs - Vt)][-(\Delta(W/L)/(W/L))] = [½ * (Vgs - Vt)][-(W/L)412(W/L)404]$$

The initial offset is preferably enabled by a tri-state command for the driver portion in this transceiver combination. The initial offset will be engaged only until the first transition of the bus signal received through the REC_IN input. Subsequent transitions of the input signal will drive the symmetric differential receiver in order to maintain the sensitivity and low skew of the differential receiver. The programmability of initial offset may provide for adjustments in different operating conditions, such as, Process/Voltage/Temperature (PVT) and noise.

It is believed that the receiver with initial offset for biased idle transmission line of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for maintaining a defined output state for a differential receiver connected to an idle state bus:
   detecting of the bus entering an idle state; and
   redistributing a current flow between a first transistor and a second transistor in the differential receiver when said bus enters said idle state, redistributing of current flow ensuring said defined output state by offsetting instantaneous process conditions causing instability during said idle state.

2. The method of claim 1, wherein redistributing said current flow is accomplished by the enabling of at least one initial offset modules.

3. The method as claimed in claim 2, wherein said at least one initial offset modules comprises:
   a third transistor; and
   at least two switches connected to the third transistor.

4. The method of claim 3, wherein the at least two switches control the enabling of the third transistor to the differential receiver.

5. The method of claim 3, wherein the enabling of at least one initial offset modules causes less current to flow through a first transistor.

6. The method as claimed in claim 3, wherein at least one signal is sent from said bus upon entering said idle state to said at least two switches, said at least one signal changing an orientation of said at least two switches.

7. A monitoring assembly for a bus, comprising:
   means for detecting when said bus enters an idle state;
   a differential receiver coupled to said detecting means; and
   means for redistributing current flow within said differential receiver, said redistributing means being coupled to said differential receiver, wherein said redistributing means redirects current flow within said differential receiver to provide a defined output state for said differential receiver by offsetting instantaneous process conditions causing instability during said idle state.

8. The monitoring assembly as claimed in claim 7, wherein said differential receiver includes two equally sized transistors.

9. The monitoring assembly as claimed in claim 8, wherein said redistributing means includes:
   a third transistor; and
   at least two switches connected to the third transistor.

10. The monitoring assembly as claimed in claim 9, wherein the at least two switches control the enabling of the third transistor.

11. The monitoring assembly as claimed in claim 10, wherein the enabling of the third transistor causes less current to flow through a first transistor of said differential receiver.

12. The monitoring assembly as claimed in claim 11, wherein at least one signal is sent from said bus upon entering said idle state to said at least two switches, said at least one signal changing an orientation of said at least two switches.

13. The monitoring assembly of claim 11, wherein the third transistor is connected in parallel to a second transistor of the differential receiver.

14. The monitoring assembly of claim 7, wherein the bus is a PCI-X 2.0 bus.

15. A data transfer system, comprising:
   a driver;
   a bus coupled to the driver;
   a differential receiver coupled to said bus; and
   at least one initial offset module coupled to said differential receiver, wherein said at least one initial offset module is capable of providing an adjustable offset to said differential receiver when said bus enters an idle state, said adjustable offset ensuring said differential receiver provides a defined output state by offsetting instantaneous process conditions causing instability in said differential receiver during said idle state.

16. The data transfer system as claimed in claim 15, wherein at least one initial offset module includes:
   a transistor; and
   at least two switches coupled to said transistor.

17. The data transfer system as claimed in claim 16, wherein each initial offset module of at least one initial offset modules provides additional offset for said differential receiver.

18. The data transfer system as claimed in claim 17, wherein each initial offset module redistributes a desired amount of current in said differential receiver when enabled.

19. The data transfer system as claimed in claim 18, wherein at least one initial offset module is enabled by receiving a signal from said bus when said bus enters said idle state.

20. The data transfer system as claimed in claim 18, wherein current in said differential receiver is redistributed by coupling said transistor of said initial offset module in parallel with a transistor of said differential receiver.

21. The data transfer system as claimed in claim 18, wherein an initial offset provided by at least one of the initial offset modules is enabled whenever the driver is tri-stated.

* * * * *